United States Patent
Willocx

(10) Patent No.: US 10,851,733 B2
(45) Date of Patent: Dec. 1, 2020

(54) ENGINE WITH DIFFERENTIAL EVAPORATION PRESSURES

(71) Applicant: Stephane Willocx, Port Grimaud (FR)

(72) Inventor: Stephane Willocx, Port Grimaud (FR)

( * ) Notice: Subject to any disclaimer, the term of this patent is extended or adjusted under 35 U.S.C. 154(b) by 720 days.

(21) Appl. No.: 15/507,949

(22) PCT Filed: Sep. 2, 2015

(86) PCT No.: PCT/EP2015/070064
§ 371 (c)(1),
(2) Date: Jul. 7, 2017

(87) PCT Pub. No.: WO2016/034632
PCT Pub. Date: Mar. 10, 2016

(65) Prior Publication Data
US 2017/0350348 A1    Dec. 7, 2017

(30) Foreign Application Priority Data

Sep. 2, 2014    (FR) ...................... 14 58207

(51) Int. Cl.
*F02G 1/055*    (2006.01)
*F02G 1/043*    (2006.01)
*F01B 17/02*    (2006.01)
*F01B 17/00*    (2006.01)
(Continued)

(52) U.S. Cl.
CPC ............. *F02G 1/055* (2013.01); *B60H 1/22* (2013.01); *F01B 17/00* (2013.01); *F01B 17/02* (2013.01);
(Continued)

(58) Field of Classification Search
CPC ........ F01B 17/00; F01B 17/022; F01B 17/02; F01B 29/00; F01B 29/08; F01B 29/10;
(Continued)

(56) References Cited

U.S. PATENT DOCUMENTS 3,527,141 A * 9/1970 Peoples ................... F01B 17/00
91/184
4,026,192 A * 5/1977 Noren .................... B21D 28/00
91/25

(Continued)

FOREIGN PATENT DOCUMENTS

CH         8 467        11/1894
CH        20 569         2/1901
(Continued)

OTHER PUBLICATIONS

International Search Report, dated Oct. 28, 2015. (Year: 2015).*
(Continued)

*Primary Examiner* — Steven M Sutherland
*Assistant Examiner* — Thuyhang N Nguyen
(74) *Attorney, Agent, or Firm* — Hauptman Ham, LLP

(57) ABSTRACT

An engine comprising: a sealed and rigid case containing a liquid and a work mixture of gas and steam from the liquid, a heat source able to heat the liquid, a cold source able to cool the work mixture, a movable device positioned within the case, which can move between a first position where the movable device minimize the contact between the work mixture and the cold source, and maximize the contact between the liquid and the work mixture, and a second position where the movable device maximize the contact between the work mixture and the cold source, and minimize the contact between the liquid and the work mixture, an actuator able to move the movable device from the first position to the second position and vice versa.

30 Claims, 5 Drawing Sheets

(51) Int. Cl.
*B60H 1/22* (2006.01)
*F01B 29/12* (2006.01)
*F01N 5/02* (2006.01)
*F02G 1/044* (2006.01)

(52) U.S. Cl.
CPC ............ *F01B 17/022* (2013.01); *F01B 29/12* (2013.01); *F01N 5/025* (2013.01); *F02G 1/043* (2013.01); *F02G 1/044* (2013.01); *B60H 2001/2275* (2013.01); *F02G 2243/30* (2013.01); *F02G 2244/02* (2013.01); *F02G 2290/00* (2013.01)

(58) Field of Classification Search
CPC .......... F01B 29/12; F01B 21/00; F01B 21/02; F02G 1/055; F02G 1/043
See application file for complete search history.

(56) References Cited

U.S. PATENT DOCUMENTS

| | | | | |
|---|---|---|---|---|
| 6,474,058 | B1* | 11/2002 | Warren | F02C 5/00 60/39.6 |
| 2011/0115223 | A1* | 5/2011 | Stahlkopf | F01K 13/02 290/7 |

FOREIGN PATENT DOCUMENTS

| | | | | |
|---|---|---|---|---|
| CN | 103883426 | 6/2014 | | |
| DE | 10 2005 040866 | 10/2006 | | |
| JP | 3-78554 | 4/1991 | | |
| JP | H11 107856 | 4/1999 | | |
| WO | 2011/087198 | 7/2001 | | |
| WO | 2014/091496 | 6/2014 | | |
| WO | WO-2014091496 A2 * | 6/2014 | ............ | F02G 1/055 |

OTHER PUBLICATIONS

Written Opinion of the International Searching Authority, dated Nov. 3, 2015. (Year: 2015).*
Eldarion, "Moteur stirling à evaporation/condensation", Sep. 14, 2011, accessed at webpage <http://www.onpeutlefaire.com/forum/topic/12483-moteur-stirling-a-evaportion/condensation/>, English translation provided.
International Search Report for corresponding International PCT application No. PCT/EP2015/070064, dated Nov. 3, 2015.

* cited by examiner

ENGINE WITH DIFFERENTIAL EVAPORATION PRESSURES

TECHNICAL FIELD OF THE INVENTION

The technical field of the invention is that of thermal machines, and specifically that of heat engines.

STATE OF THE ART

Several types of engines are known for transforming thermal energy into mechanical or electrical energy.

Some of these engines are reversible and can be reciprocally used as generators to transform mechanical energy into thermal or pressure energy: refrigeration and/or compression/liquefaction of a gas.

The Stirling engine uses a difference in temperature applied to a gas in a closed case to produce mechanical energy, or vice versa. Such engine has the drawback of requiring a large difference in temperature to reach a usable efficiency.

The Rankine engine has the drawback of requiring numerous steps of energy transfer which result in low efficiency. Besides, it requires a condensate return pump.

The main drawback of a turbine engine is its high cost.

The internal combustion engine has known a major development, specifically thanks to cars, but has the drawback of being made of many moving parts, which results in low efficiency. Besides, the fuels which can be used therewith are not many.

The main drawback of the steam engine is that it consumes water in addition to fuel.

SUMMARY OF THE INVENTION

One aim of the present invention is to provide a new paradigm of a thermal machine, which can be used as an engine, so as to transform thermal energy into mechanical, or electrical energy and vice versa.

For this purpose, according to one embodiment, the invention provides for:
- a case containing a liquid and a work mixture consisting of at least steam from the liquid, with the case comprising at least one cooling wall and at least one heating wall;
- a cold source so configured as to cool the at least one cooling wall and the work mixture, with the cold source and the work mixture being able to be placed on either side of the at least one cooling wall;
- a heat source so configured as to heat the liquid or at least one heating wall, with the heat source and the liquid being placed on either side of the at least one heating wall;
- movable means positioned within the case, which can move between a first position and a second position, with the engine being so configured that:
  - the heat exchange between the work mixture and the at least one cooling wall in the second position is greater than the heat exchange between the work mixture and the at least one cooling wall in the first position;
  - the movable means enable the contact between the liquid and the work mixture in the first position and that the movable means are inserted between the liquid and the work mixture in the second position;
- an actuator able to move the movable means from the first position to the second position and vice versa.
- at least one cylinder comprising at least one piston, with said piston being different from the movable means and the actuator, with one space of said cylinder being in fluid communication with the case so as to contact the work mixture.

This engine, which can also be called a differential evaporation pressure engine, efficiently uses the non-linear variation phase of the pressure rise and also the non-linear variation phase of the pressure drop. It advantageously benefits from the change of state (liquid to gaseous) of a liquid, producing a large variation in pressure for a slight variation in temperature, at a temperature close to and lower than its boiling temperature. The engine can thus operate at a relatively low temperature and requires only a slight difference in temperature (between its heat source and its cold source) in order to reach usable efficiency.

For instance, the engine requires only a difference in temperature of about 50° between its heat source and its cold source in order to reach usable efficiency.

This provision has numerous advantages.

Thanks to the presence of steam, the engine has a good capacity of heat transfer, which ensures a high efficiency thereof.

The engine is composed of few parts, has a low complexity, and can thus be produced at a low cost.

Another advantage of the engine is that it can operate with any type of source of thermal energy.

According to another embodiment, the invention also relates to an engine assembly comprising at least two engines according to the invention, which operate in opposite phases, wherein the movable means of said at least two engines are mechanically connected so that the respective moving masses thereof are counterbalanced. Such advantageous solution makes it possible to enhance the engine efficiency.

The invention also relates to a system comprising at least one engine and a generator coupled to the piston and so configured as to produce electricity from the mechanical energy available on the piston. Such system advantageously enables a highly cost effective production. The transformation of a mechanical movement into electricity enables a wide application of the engine.

Besides, the invention relates to the method for controlling an engine wherein, during the whole operation thereof, temperature and pressure conditions are applied to the liquid so that the liquid does not boil. Such method is particularly important to preserve the engine efficiency.

Eventually, the invention also relates to a heat pump which advantageously comprises:
- a sealed and rigid case containing a liquid and a work mixture comprising at least steam from the liquid,
- a heat source able to heat the liquid,
- a cold source able to cool the work mixture,
- movable means, positioned within the case, which can move between:
  - a first position where the movable means minimize the volume of the heat exchange between the work mixture and the cold source, and maximize the volume of the heat exchange between the liquid and the work mixture, and
  - a second position where the movable means maximize the volume of the heat exchange between the work mixture and the cold source, and minimize the volume of the heat exchange between the liquid and the work mixture, and
- an actuator able to move the movable means from the first position to the second position and vice versa.

one cylinder comprising one piston being different from the movable means and the actuator, with one space of said cylinder being in fluid communication with the case so as to contact the work mixture;

with the heat pump being so configured that the displacements of the piston and of the movable means cause a transfer of heat from the heat source to the cold source.

Optionally, the invention may further have at least any one of the following characteristics which may be taken into account separately or in combination:

the work mixture contains at least one gas and steam from the liquid, with the gas being different from the steam.

for the same rise in temperature, the pressure of the liquid steam increases the pressure of the work mixture faster than the gas pressure alone.

the second position is so configured that the movable means prevent or reduce the formation of steam from the liquid.

the engine is so configured that, in the first position, the movable means minimize the volume of the heat exchange between the work mixture and the cooling walls, and that, in the second position, the movable means maximize the volume of the heat exchange between the work mixture and the cooling walls.

the engine is so configured that, in the first position, the movable means minimize the volume of the heat exchange between the work mixture and the at least one cooling wall, and that, in the second position, the movable means maximize the volume of the heat exchange between the work mixture and the at least one cooling wall.

the surface of heat exchange between the work mixture and the cold source is at least five times greater than the surface of heat exchange between the work mixture and the surface of the liquid.

the movable means are inserted between the cooling walls and the work mixture in the first position and enable the contact between the work mixture and the cooling walls in the second position.

the case comprises at least one case portion wherein the liquid is present and the heat source heats the liquid present in the case portion.

the heat source is in contact with the at least one heating wall, also called a hot wall.

the at least one cooling wall of the case and the first wall of the movable means have conical shapes, with an axis substantially parallel to the displacement of the movable means.

the temperature and pressure conditions applied to the liquid during the operation remain lower than the temperature and pressure conditions enabling the liquid to boil. Such characteristic is not indispensable but makes it possible to significantly enhance the performances of the engine;

more particularly, the engine is so configured as to control the heat source so that the temperature of the liquid remains lower than the boiling temperature thereof under the pressure conditions of use.

the temperature and pressure conditions applied to the liquid are such that, for a given pressure, the temperature of the liquid ranges from 1.0*Tli to 0.98*Teb, with Teb being the boiling temperature for such pressure, and Tli being the liquefaction temperature for such pressure.

The boiling point is thus approached as close as possible without being reached. This makes it possible to work under conditions where the pressure variation is maximum for a given temperature variation. This makes it possible not to exceed the production of steam to be cooled. The efficiency of the machine is thus enhanced;

the volume of the heat exchange between the liquid and the work mixture is greater in the first position than the volume of the heat exchange between the liquid and the work mixture in the second position.

the engine is so configured that: the movable means are inserted between the at least one cooling wall and the work mixture in the first position and enable the contact between the work mixture and the at least one cooling wall in the second position.

the movable means comprise a first wall having a shape matching the shape of the at least one cooling wall and so configured as to cover at least a part of the at least one cooling wall in the first position and to release or uncover at least a part of the at least one cooling wall in the second position.

the movable means comprise a second wall so formed as to release or uncover at least a part of the surface of the liquid in the first position and to cover at least a part of the surface of the liquid in the second position.

the first wall and/or the second wall has/have a recessed shape, the first wall and/or the second wall has/have a recessed shape, and are made of light strain-resistant materials.

and where a heating wall provides the interface between the heat source and the liquid, and where the cold wall and/or the heating wall are made of copper, graphite or any other composite material.

the movable means, specifically the first wall and/or the second wall are made of a material lighter than steel, typically a carbon fiber material or a composite material.

the shape of the cooling wall and the matching shape of the first wall opposite thereof are optimized to increase the surface released by the displacement of the movable means.

such shapes are conical, with an axis substantially parallel to the displacement of the movable means.

the case comprises, in contact with the surface of the liquid, a drilled wall a grid, and on the periphery of the surface of the liquid, a turbulence preventing rim.

liquid is water and gas is air, nitrogen, carbon dioxide, hydrogen or helium or a mixture of such gases.

the actuator is independent of the piston.

the actuator is indirectly driven by the piston.

a heating wall provides the interface between the heat source and the liquid, and where the cold wall and/or the heating wall has/have a high thermal conductivity thanks to the composition thereof of copper or graphite or any composite material having a high thermal conductivity.

the intermittent cooling of the mixture makes it possible to cause a variation in the pressure of the mixture. Covering the hot surface is not indispensable. A displacement of the mixture in the hot areas and the cold areas is required however for the thermal exchange.

the temperature and pressure conditions applied to the liquid are such that, for a given pressure, the temperature of the liquid ranges from 1.0*Tli to 0.98*Teb, with Teb being the boiling temperature for such pressure, and Tli being the liquefaction temperature for such pressure.

a sealed and rigid case comprising a liquid and a work mixture consists of at least one gas and steam from the liquid, with the at least one gas being different from steam and wherein, for the same increase in temperature, the pressure of the liquid steam increases the pressure of the work mixture faster than the gas pressure alone.

According to another embodiment, the invention relates to a sealed case containing a liquid and a work mixture consisting of at least gas and steam from the liquid, a heat source so configured as to heat the liquid without reaching the liquid boiling point, a cold source so configured as to cool the work mixture, movable means or element positioned within the case, which can move between a first position where the movable means minimize the heat exchange between the work mixture and the cold source, and maximize the heat exchange between the liquid and the work mixture, and a second position where the movable means maximize the heat exchange between the work mixture and the cold source, and minimize the heat exchange between the liquid and the work mixture, and an actuator able to move the movable means from the first position to the second position and vice versa.

The heat exchange between the work mixture and the cold source in the first position of the movable means is thus smaller than the heat exchange between the work mixture and the cold source in the second position. The heat exchange between the liquid and the work mixture in the first position of the movable means is thus greater than the heat exchange between the liquid and the work mixture in the second position.

According to another embodiment, the invention relates to a system comprising at least one engine according to the invention and a generator coupled to the piston and so configured as to produce electricity from the mechanical energy available on the piston.

According to another embodiment, the invention relates to a method for controlling an engine according to the invention, wherein the conditions applied to the liquid in operation, preferably during the whole operation, or at least during a complete operation cycle, remain lower than the liquid boiling conditions, so that the liquid will not boil.

The temperature and pressure conditions applied to the liquid are thus such that, for a given pressure, the liquid temperature does not cause the boiling of the liquid.

According to another embodiment, the invention relates to a thermal machine comprising: a sealed case containing a liquid and a work mixture consisting of gas and steam from the liquid, a heat source able to heat the liquid, a cold source able to cool the work mixture, movable means or movable element positioned within the case, which can move between a first position where the movable means minimize the contact between the work mixture and the cold source, and maximize the contact between the liquid and the work mixture, and a second position where the movable means maximize the contact between the work mixture and the cold source, and minimize the contact between the liquid and the work mixture, an actuator able to move the movable means from the first position to the second position and vice versa.

According to one embodiment, the heat machine is used as an engine.

According to one embodiment, the heat machine is used as a heat pump. The heat pump being so configured that the displacement of the work mixture causes a transfer of heat from the heat source to the cold source. In this case, mechanical energy is thus supplied to the system at the piston and heat is obtained at the cold source.

According to another embodiment, the invention relates to an engine comprising:
  a case containing a liquid and a work mixture consisting of at least one gas and steam from the liquid, with the gas being different from the steam.
  a cold source able to cool the work mixture,
  a heat source so configured as to heat the liquid,
  movable means positioned within the case, which can move between a first position and a second position, with the engine being so configured that the heat exchange between the work mixture and the at least one cold source in the second position is greater than the heat exchange between the work mixture and the cold source in the first position;
  an actuator able to move the movable means from the first position to the second position and vice versa;
  at least one cylinder comprising at least one piston, with a space of said cylinder being in fluid communication with the case, so as to be in contact with the work mixture;
  wherein, for the same rise in temperature, the pressure of the liquid steam increases the pressure of the work mixture faster than the gas pressure alone.

BRIEF DESCRIPTION OF THE FIGURES

Other characteristics, details and advantages of the invention will become apparent from the detailed description given below for information in connection with the drawings in which:
FIG. 1 illustrates the pressure phase,
and
  FIG. 2 illustrates the pressure drop phase.

DETAILED DESCRIPTION OF THE INVENTION

Figure 1:
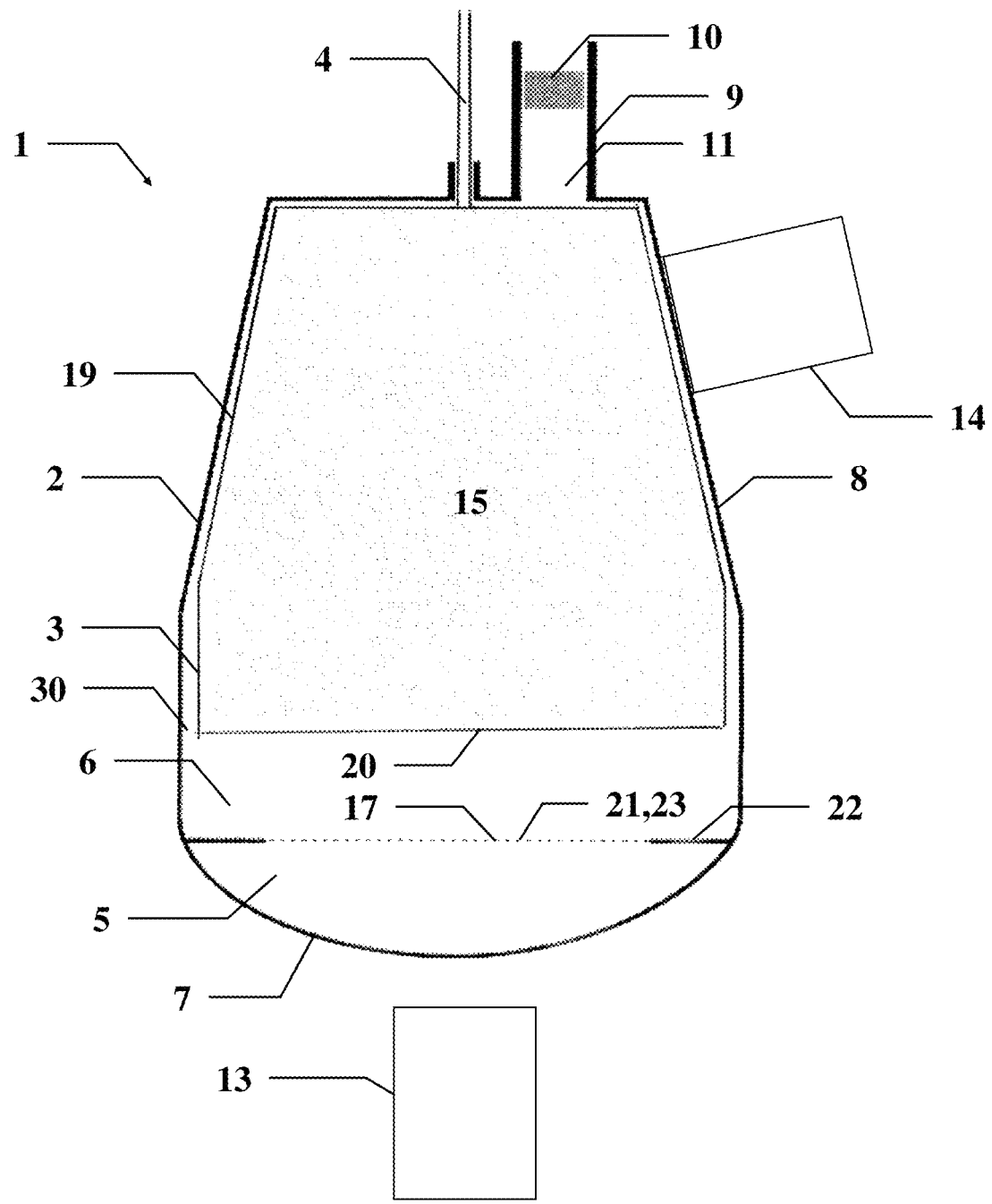
FIGS. 1 and 2 illustrate the operating principle of the engine according to one embodiment of the invention.
Figure 2:
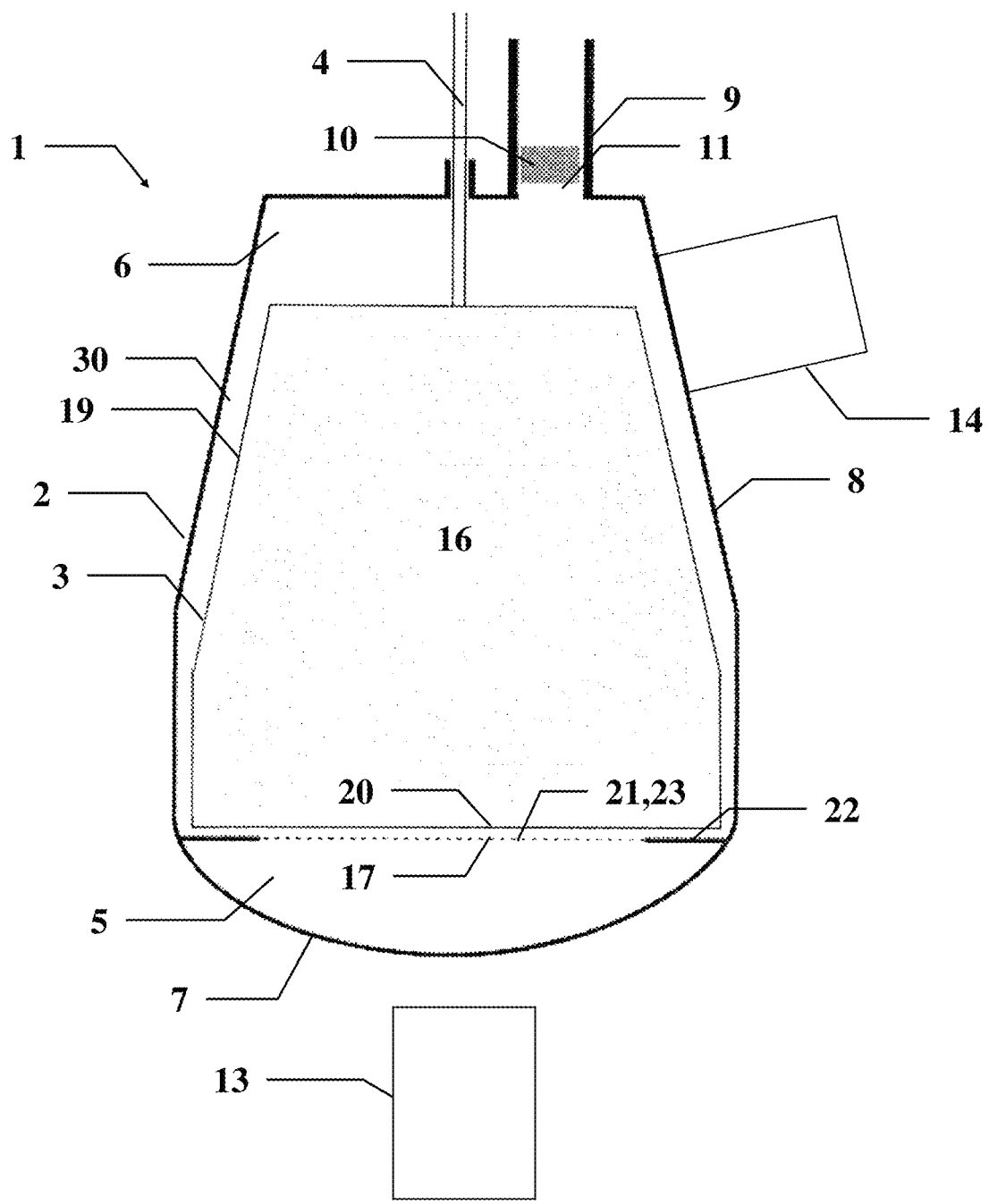

As shown in FIGS. 1 and 2, according to a possible embodiment, the thermal machine/engine 1 according to the invention comprises a sealed and rigid case 2, 7, 8. Such case 2, 7, 8 comprises a working space which contains a work mixture 6 consisting of at least steam from the liquid 5. Movables means 3 are positioned in the working space 30.

According to a first embodiment illustrated in FIGS. 1 to 4, the case 2, 7, 8 is closed and liquid- as well as gas-tight. Besides, a liquid 5 from which steam originates is placed into the case 2, 7, 8. The sealing of the case 2, 7, 8 enables the engine 1 to operate in a closed circuit. No mixture or liquid input or output was required for the engine to operate.

In this embodiment, the case 2, 7, 8 thus contains the working space 30 as well as a volume wherein the liquid 5 is contained. The case more particularly comprises the walls 7 and 8.

As shown in FIGS. 1, 2, the liquid occupies and fills a part forming a liquid tank, here the lower part of the case 7. The work mixture 6 occupies and fills the rest of the internal volume of the case 2, 7, 8, not occupied by the movable means 3. Of course, some liquid may be present on the walls of the rest of the case, more particularly because of the steam condensing on the cooling walls 2 and 8. Such liquid which may result from condensation is present in a much smaller quantity than the liquid present in the container tank defined by the case 7.

The operation of the thermal machine/engine 1 requires the presence of at least one heat source 13 and of at least one cold source 14. In a preferred embodiment, only one heat source 13 per case 2, 7, 8 is present throughout the invention. In this embodiment, the heat source 13 is thus able to heat the liquid 5. The heat source 13 is preferably applied to the heating of the liquid 5 in order to enable the formation of steam at the surface of the liquid 5. The cold source 14 is able to cool the cooling walls 2, 8 of the case, and thus the work mixture 6. As a matter of fact, the cold source 14 is not directly in contact with the work mixture 6. The cooling walls 2, 8 enable the cooling of the work mixture 6. In the following description, contact between the cold source 14 and the work mixture 6, should be understood as an «indirect contact» and the cooling walls 2,8 should be understood as inserted between the cold source 14 and the work mixture 6. This is clearly illustrated in FIGS. 1 and 2 where the cold source 14 and the walls of the case can be seen. The cold source 14 is preferably selectively applied to the cooling of the work mixture 6, as will be disclosed hereunder.

The movable means 3 are totally contained in the case 2, 7, 8 and can move within the case 2, 7, 8 between a first position 15 and a second position 16. Such mobility aims at moving the work mixture 6. The movable means 3 ideally have a constant volume.

According to one embodiment, the piston 10 and the movable means 3 are advantageously different. They are not mechanically coupled together. They are not integral. Similarly, the actuator 4 able to move the movable means 3 from the first position 15 to the second position 16 and vice versa is not integral with the piston 10 when moving.

In the first position 15, illustrated in FIG. 1, which corresponds to a pressure phase, the movable means 3 are so positioned that the contact between the mixture and the cooling walls 2, 8, and thus the heat exchange between the work mixture 6 and the cold source 14 are minimized, and that the heat exchange between the liquid 5 and the work mixture 6 is maximized. For this purpose, the movable means 3 will advantageously cover at least a part of the cooling walls 2, 8 and increase the volume of the case 2, 7, 8 above the liquid 5. In this first position 15, the liquid 5 heated by the heat source 13 and in contact with the work mixture 6 thus tends to supply steam to the work mixture 6. As the contact between the work mixture 6 and the cooling walls cooled by the cold source 14 is minimum or even non-existing, the work mixture 6 is slightly or even not cooled. The result is that pressure, mainly from the work mixture 6, increases inside the case 2, 7, 8, in the configuration connected to the first position 15.

In the second position 16 illustrated in FIG. 2, which corresponds to a pressure drop phase, the movable means 3 are so positioned as to maximize the contact between the work mixture 6 and the cooling walls 2, 8, which thus results in an increase in the heat exchange between the work mixture 6 and the cold source 14, and to be inserted between the liquid 5 and the work mixture 6 so as to reduce or even eliminate the heat exchange between the work mixture 6 and the liquid 5, heated by the heat source 13. In the second position 16, the contact between the liquid 5 and the work mixture 6 is thus minimum or even non-existent, and a large portion of the work mixture is in contact with the cooling walls 2, 8, the liquid 5 steam gain in the mixture is thus reduced to a minimum. In parallel, the contact between the work mixture 6 and the cold source 14 is maximum, which results in the cooling of the work mixture 6. The result is that the pressure of the work mixture 6 drops in the case 2, 7, 8, in such a configuration connected to the second position 16.

In order to alternately move the movable means 3 from the first position 15 to the second position 16, and then from the second position 16 to the first position 15, the thermal machine/engine 1 also comprises an actuator 4.

The motion used between the first position 15 and the second position 16 may be any motion. Such motion may, for instance, result from a rotation, a helical motion or a translation. The displacement from the first position 15 to the second position 16 may be the reverse of the movement used to switch from the second position 16 to the first position 15 or a different movement. The important point is that the movable means 3 alternately takes the first position 15, thus generating an increase in the pressure inside the case 2, 7, 8, and the second position 16, thus generating a reduction in the pressure, or a pressure drop inside the case 2, 7, 8.

An alternative pressure variation is thus generated inside the case 2, 7, 8, using a heat source 13, which heats the liquid 5 and a permanent cold source 14, which selectively cools the work mixture 6. It should be noted that the pressure variation obtained is significant, including for a temperature variation, and the difference between the temperature of the heat source 13 and the temperature of the cold source 14, relatively small. As a matter of fact, the engine 1 takes advantage of a high-pressure gradient relative to temperature when temperature is close to the boiling point of the liquid 5, although remaining below such boiling point.

Figure 5:
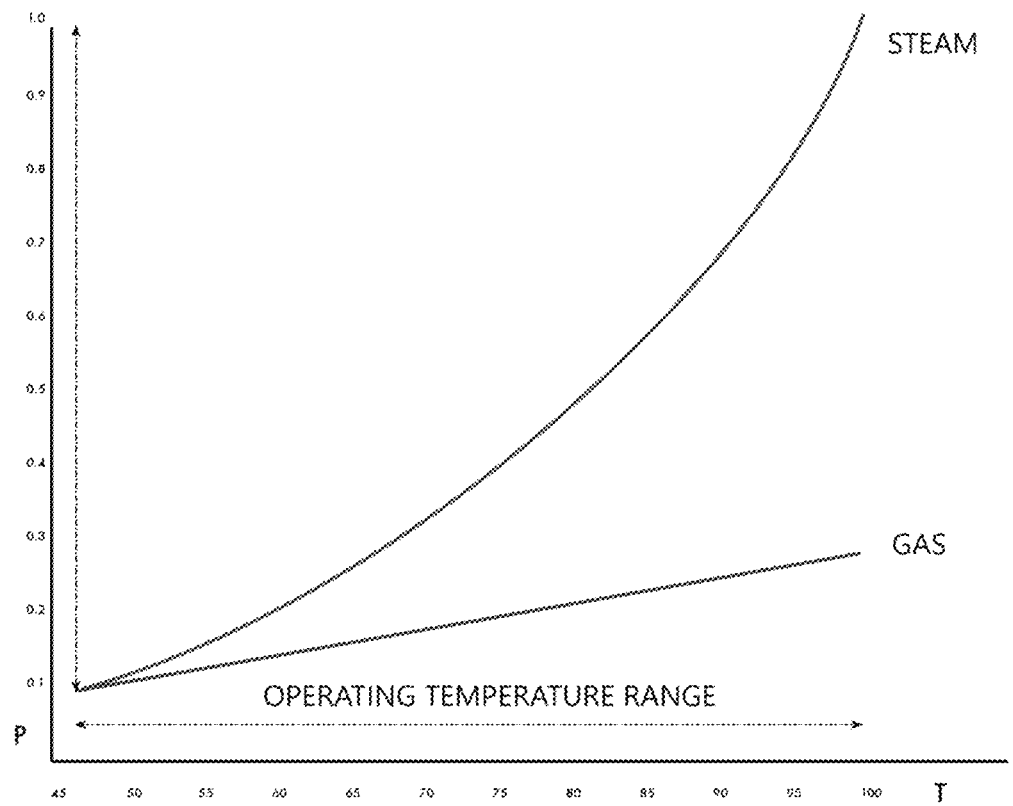
FIG. 5 is a temperature/pressure diagram for a gas, and steam, respectively of an exemplary work mixture according to the invention.

FIG. 5 is a temperature/pressure diagram for a gas, and steam, respectively of an exemplary work mixture. The diagram clearly shows that the (saturating) steam pressure increases with temperature, in a non-linear way. For the same rise in temperature, the increase in the steam pressure is much higher than when getting close to the boiling point. This is not true for the gas in the mixture.

Generally speaking, the invention takes advantage of the fact that, when the volume of the gas/steam mixture is in the hot portion, steam is present in greater quantities than when in the cold portion, since temperature favours the change from the liquid state to the steam state. The gas/steam ratio thus changes during the cycle. The quantity of gas remains constant and the quantity of steam varies. Gas pressure linearly increases with temperature whereas steam increases along a curve upwards, having a significantly steeper slope. The diagram in FIG. 5 shows that the difference in the steam pressure increases almost five times as much as that of the gas under the same conditions. The pressure in the work mixture will depend on the variation in the gas/steam quantity ratio.

The invention uses such advantage in both phases, i.e. during the pressure phase and during the pressure drop phase.

The invention mainly uses variations in the steam pressure to obtain a better efficiency than the Stirling engines or the steam engines.

The mixture should not be considered as an homogeneous gas but as a gaseous mixture, with the quantity of steam being the momentary consequence of the changing state of a part of the liquid.

The engine 1 can operate beyond the liquid 5 boiling point, but excessive steam generation then affects efficiency. The engine 1, the components thereof, the thermal characteristics of the liquid 5, of the work mixture 6, the thermal capacities of the heat source 13 and the cold source 14, are advantageously computed and sized so that the temperature and pressure operating conditions remain below the liquid 5 boiling temperature and pressure conditions.

Optimization thus consists in getting as close as possible to, but below, the liquid 5 boiling temperature and pressure conditions, without reaching the boiling point.

The engine 1, as described so far, makes it possible to create a variation in the alternative pressure inside the case 2, 7, 8. According to one embodiment, such alternative pressure can advantageously be used, with a deformable case 2, whether telescopic or flexible, to obtain an alternative variation in the volume.

According to another embodiment, the engine 1 comprises a cylinder 9. The cylinder 9 comprises a cylindrical internal volume which receives a piston 10, with said piston 10 being adapted to slide substantially in translation, in a direction coinciding with the axis of the cylindrical volume. Such a cylinder 9 defines two spaces on either side of the piston 10 which separates same. One space 11, among these two spaces, is in fluid communication with the case 2, 7, 8. The fluid communication is such that the space 11 is in contact with the work mixture 6, contained in said case 2, 7, 8.

Advantageously and contrary to what can be seen in FIGS. 1,2, the connection between the inside of the case 2, 7, 8, which contains the work mixture 6, and the cylinder 9 chamber 11 is preferably permanent. The upper surface of the movable means 3, included in the first position 15, does not hinder the connection. A connection is provided in a plane which is not visible in the figure or using a pipe, not shown.

The cylinder 9 aims at taking advantage of the alternative pressure variation generated in the case 2, 7, 8, to cause the linear reciprocating displacement of the piston 10. In the pressure phase, illustrated in FIG. 1, with the movable means 3 in the first position 15, pressure thus increases and pushes the piston 10, which is centrifugally driven, i.e. upwards in the plane of the figure. On the contrary, in the pressure drop phase illustrated in FIG. 2, with the movable means 3 in the second position 16, pressure drops and draws the piston 10, which is centripetally driven, i.e. downwards in the plane of the figure. Alternating positions of the movable means 3, among the first position 15 and the second position 16, thus produces a linear reciprocating displacement of the piston 10.

Such a piston 10 is the engine 1 output device. Linear reciprocating movement can be used as such to produce a linear reciprocating mechanical movement. According to an alternative solution, the movement of the piston 10 can be transformed, for instance using a rod/crankshaft system, into a rotating movement for rotary driving, mobility or electric production applications. According to an alternative solution, the reciprocating movement of the piston 10 can be directly used to produce electricity using a linear generator: the piston 10 then comprises or drives a magnetic core moving in suitable windings. The piston 10 alternately comprises or drives a winding.

As can be seen, the present engine 1 may be used in numerous applications.

To have the maximum variation in pressure directed towards the cylinder 9 and the piston 10, assumed to be the only element which can be harnessed in response to the variable pressure, the other components, i.e. the case 2, 7, 8, and the movable means 3 are ideally non-deformable and advantageously rigid enough to resist pressure variations, which occur when the engine 1 is operating.

Such engine 1 is all the more efficient since its energy balance is favourable. Such energy balance is improved by maximizing the energy produced at the cylinder 9 and the piston 10 and by minimizing the consumed energy. The energy consumed is, on the one hand, the thermal energy supplied at the heat source 13 and the cold source 14, and on the other hand, the energy required by the actuator 4 to harness the movable means 3. Whatever the embodiment of the actuator 4, disclosed hereunder, the minimization of such displacement energy takes advantage of as light as possible movable means 3, so that the displaced mass is low, as well as the displacement energy.

The selection of materials is important. The external surface of the movable means 3 only is functional. The movable means 3 may advantageously be recessed, if the walls thereof comply with the above-mentioned mechanical constraints (pressure strength) and thermal constraints disclosed above.

It may be understood from the above description that the engine 1 cycle is driven by the displacement of the movable means 3. The control law of the actuator 4 is thus determining for the engine 1. According to a first embodiment, the actuator 4 is independent. In this mode, the control law of the actuator can be any law. In a preferred mode, said control law is optimized to take the maximum advantage of the thermodynamic behaviour of the case 2 and the contents thereof. The actuator 4 frequency will thus be advantageously determined relative to the time constant of the pressure and pressure drop phases, for instance. The shape of the control law in the pressure and pressure drop phases, can also advantageously be adapted to the thermodynamic characteristics.

One obvious drawback of the previous embodiment is related to the advantage thereof. The actuator 4 independence lies in that it requires its own reciprocating generator. The idea is to use the reciprocating movement available at the engine 1 outlet, at the cylinder 9 and the piston 10, to take a part of the energy available to drive the movable means 3. Such an embodiment requires a phase adaptation between the displacement of the piston 10 and the movement to be applied to the movable means 3. In the configuration illustrated, where the axis of the cylinder 9 coincides with the axis of the displacement of the movable means 3, a shifting of $\pi/2$ radians with advance should be applied to the movable means 3. The drawback of such embodiment is that it seems difficult to reach optimum efficiency at present.

It should be noted that such embodiment makes it possible to produce a self-starting engine, which is another significant advantage of such an engine 1.

The actuator 4 can be produced according to many different modes. The function of the actuator 4 is to move the movable means 3 relative to the case 2, 7.

When and as possible, the case 2, 7, 8 must remain closed and sealed. For this purpose, and not to have any mechanical interface through the case 2, 7, 8 wall, a first embodiment consists in positioning the active element of the actuator 4: jack, rotary engine, linear engine or any other one, inside the case 2, 7, 8. This may be difficult, because of the temperature and pressure conditions inside the case 2, 7, 8 and the conditions of creation of a parasitic volume.

According to another embodiment which has no mechanical interface through the case 2, 7, 8 wall either, the active element of the actuator 4 is positioned outside the case 2, 7, 8 and harnesses the movable means 3 without any contact therebetween. This is typically obtained using magnetic means which act on magnetized or at least partially ferrous movable means 3. Such embodiment is all the more easily realized since the mass of the movable means 3 is low.

Eventually, according to still another embodiment, as illustrated in the figures, the active element of the actuator 4 is positioned outside the case 2, 7, 8 and mechanical actuating means go through the wall of the case 2, 7, 8. In this mode, the passage through the wall must be studied, so as not to affect sealing.

It should be noted that the three embodiments described above for the actuator 4 can of course be applied to an independent actuator 4, but can also be applied in the case of coupling with the piston 10.

The movable means 3 will now be described in greater details. As described above, in the first position 15, the movable means 3 minimize the contact between the work mixture 6 and the cold source 14, and maximize the contact between the liquid 5 and the work mixture 6. On the contrary, in the second position 16, the movable means 3 maximize the contact between the work mixture 6 and the cold source 14, and minimize the contact between the liquid 5 and the work mixture 6.

Therefore, according to one embodiment, the movable means 3 are so shaped as to be inserted between the cold source 14 and the work mixture 6 and to enable the contact between the liquid 5 and the work mixture 6, in the first position 15, so as to act onto both means which contribute to increasing pressure inside the case 2, 7, 8. The movable means 3 are also so shaped as to enable the contact between the work mixture 6 and the cold source 14 and to be inserted between the liquid 5 and the work mixture 6 in the second position 16, so as to act onto both means which contribute to reducing pressure inside the case 2, 7, 8.

According to one embodiment, the case 2, 7, 8 comprises a cold wall 2, 8 also called a cooling wall, cooled by the cold source 14. In this mode, the movable means 3 comprise a first wall 19 having a shape matching the shape of the cold wall 2, 8. Said first wall 19 is able to cover the whole or a part of the cold wall 2, 8 in the first position 15. As shown in FIG. 1, the movable means 3 in the first position 15 are thus positioned at the top and the first wall 19 thereof is superimposed on and covers the cold wall 2, 8. In this position, the movable means 3 are inserted between the work mixture 6 and the cold source 14 and reduces or prevents the cooling of the work mixture 6. On the contrary, in the second position 16, the first wall 19 releases the cold wall 2, 8. As shown in FIG. 2, the movable means 3 in the second position 16 are thus positioned at the bottom and the first wall 19 thereof is positioned away from the cold wall 2, 8. In this position, the movable means 3 release an interstitial space between the first wall 19 and the cold wall 2, 8 and enable the work mixture 6, which naturally occupies the whole available space, to contact the cold wall 2, 8 and thus cool down. In the example shown, such function is provided by the first wall 19 positioned at the top of the movable means 3.

In parallel, the movable means 3 also comprise a second wall 20 having a shape matching the shape of the surface 17 of the liquid 5. Said second wall 20 is able to cover the whole or a part of the surface 17 of the liquid in the second position 16. As shown in FIG. 2, the movable means 3 in the second position 16 are thus positioned at the bottom and the second wall 20 thereof is superimposed on and covers the surface 17 of the liquid 5. In this position, the movable means 3 are inserted between the liquid 5 and the work mixture 6 and reduce the steam gain in the work mixture. On the contrary, in the first position 15, the second wall 20 releases the surface 17 of the liquid 5. As shown in FIG. 1, the movable means 3 in the first position 15 are thus positioned at the top and the second wall 20 thereof is positioned away from the surface 17 of the liquid 5. The steam gain in the work mixture thus increases and the pressure rise is accelerated. In the example shown, such function is provided by the second wall 20 positioned at the bottom of the movable means 3.

In order to increase the thermal efficiency of the engine 1, it is advantageous for the movable means 3 to act as a heat insulating material and to provide a high insulation. Such characteristic is at the very least provided for the thermally functional walls, either for the first wall 19 or for the second wall 20, and advantageously for both walls 19, 20.

Similarly to the cold wall 2, 8 mentioned above, a hot wall 7, also called a heating wall, provides the interface and the separation between the heat source 13 and the liquid 5. In order not to affect the heat transfer balance, the cold wall 2, 8 or the heating wall 7, and advantageously both walls 7 and 2, 8 has/have a high thermal conductivity.

The embodiment of the heat source 13 and the cold source 14 has not been disclosed yet. The simplest cold source comprises the ambient air surrounding the cold wall 2, 8 of the case 2, 7, 8. Depending on the dimensions of the engine 1, a sufficient volume of ambient air and the natural convection may be sufficient to act as a cold source 14 enabling the engine 1 to operate. Depending on the conditions of use, another coolant, such as air, water, or another one, may also be used. The cold source 14 may also comprise a forced circulation. A cooling circuit may also complete the cold source 14.

The heat source 13 may also be provided according to many embodiments. The engine 1 is an engine of the external combustion type. As such, it has the advantage of such engine type in that the heat of the heat source 13 may have any origin. Heat can thus, not restrictively, result from the combustion of a fossil or renewable fuel, from a nuclear battery, from the sun, from an exothermic chemical reaction, from electric means, from geothermal energy or from volcanism.

The embodiment of the heat source 13 is also advantageous in that it enables several alternative solutions. As shown in FIGS. 1, 2, the heat source 13 may also be positioned outside the case 2, 7, 8, for instance under the liquid 5 and be separated therefrom by a hot wall 7. According to another embodiment, the heat source 13 may also be immersed in the liquid 5. A remote heat source 13 may also be used, with a steam coil in or around the liquid 7, comprising a coolant circulating between the heat source and the liquid 5.

Another advantage of the engine 1 is also to enable non-polluting versions. The liquid 5 and the work mixture 6, contained in the case 2, 7, 8, remain therein and thus cannot contaminate a fragile or hazardous environment. The heat source 13 as well as the cold source 14 may be own sources or remote sources.

Figure 3:
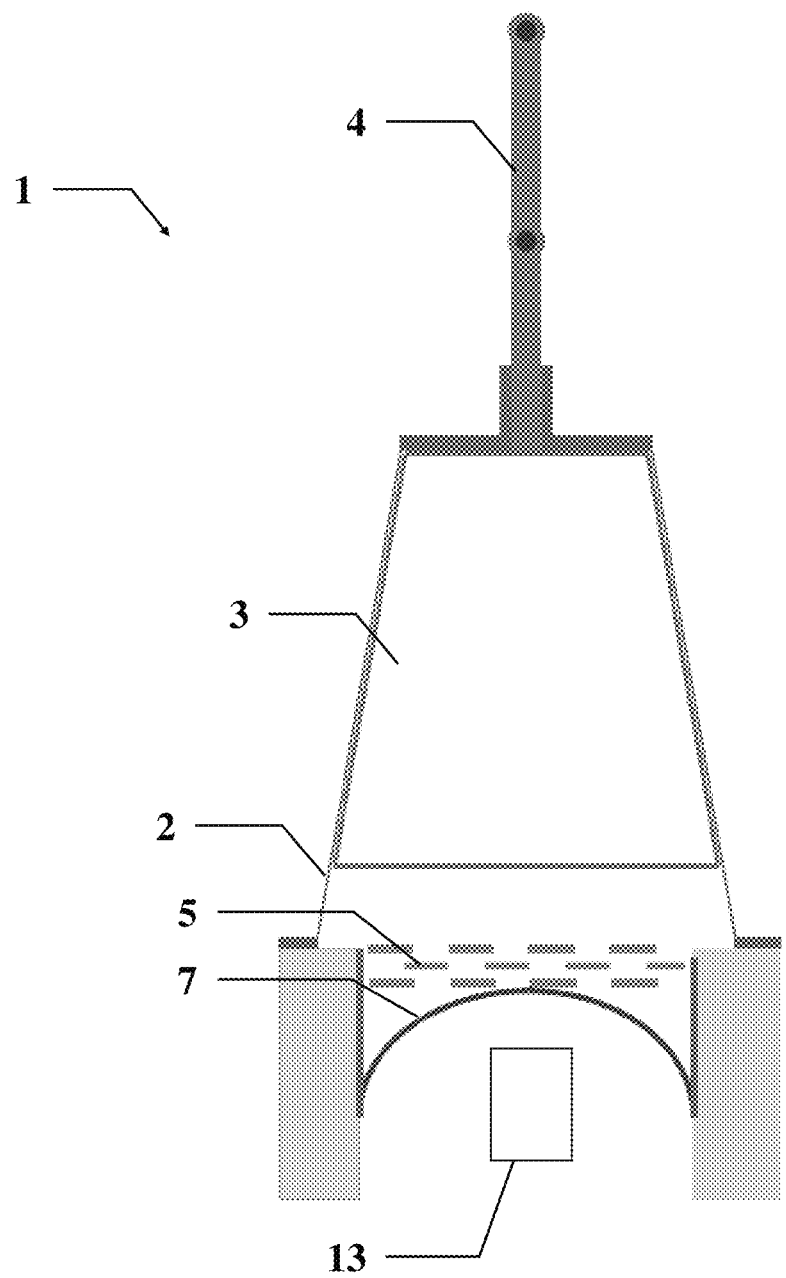
FIG. 3 illustrates another embodiment.

The shape of the hot wall 7, as illustrated in FIGS. 1, 2, i.e. as a crucible (with the curvature turned downwards, in the plane of the figure), is purely indicative. The shape of a reversed crucible (with the curvature turned upwards in the plane of the figure), as illustrated in FIG. 3, thus reveals interesting in that it concentrates the heat from the heat source 13.

According to another characteristic, the shape of the cold wall 2, 8 and the matching shape of the first wall 19 opposite thereof are optimized to increase the surface released by the displacement of the movable means 3. A small bias of the slope of both shapes, relative to the direction of displacement of the movable means 3, makes it possible to release a large surface for a small displacement of the movable means 3. Such a bias enables an easy dynamic movement by limiting the detrimental effects of suction, like a suction cup, which might occur. According to one embodiment, taking advantage of such bias, the shape of the two opposite walls 2, 8 and 19 comprises one or more cones with a small opening angle.

Such a conical shape is also advantageous as regards the mass resistance, in that it makes it possible to obtain a case 2, 8 with a good rigidity, so as to resist pressure stress, while having a low wall thickness, in order to favour the thermal conductivity of the cold wall 2, 8 and/or movable means 3 with a good rigidity, so as to resist pressure stress, while having a low wall thickness, in order to favour a low mass.

The second wall 20 may have any shape. However, in order to match the surface 17 of the liquid 5, under normal conditions of gravity, the second wall 20 has a flat surface substantially parallel to said surface 17 of the liquid 5.

As shown in FIGS. 1, 2, the part of the case 7 which receives the liquid 5, i.e. the lower part of the case 2, 7, 8 is advantageously delimited, on the surface 17 of the liquid 5, by a drilled wall 21. According to another embodiment, such delimitation is provided by a grid 23. According to another alternative or complementary embodiment, a solid turbulence preventing rim 22 is provided on the periphery of the surface of the liquid 17.

The steam inlet to the working space 30 is thus provided by such delimitation, for instance a grid 23 or a turbulence preventing rim 22, or any other type of aperture.

According to one embodiment illustrated in the figures, each case 2, 7, 8 comprises only one movable means 3. Each case 2, 7, 8 comprises only one piston 11. Each case 2, 7, 8 comprises only one heat source 13.

It has been mentioned above that the case 2, 7, 8 contains a liquid 5 and the steam thereof. Liquid and steam should be understood here under the operating conditions proper to the engine 1 (and not necessarily under usual ambient conditions). In a cryogenic or spatial environment, the liquid may be nitrogen as a liquid, and the steam from nitrogen as a gas.

Several possible solutions exist for the liquid 5 and the steam therefrom as well as for the additional gas.

For instance, the liquid 5 may be water or any liquid mixture making it possible to adapt the conditions of evaporation to the conditions of use.

As a non-restrictive example, gas may be air, nitrogen, carbon dioxide, hydrogen, helium, or a mixture of these.

It should be noted that, according to one embodiment, a gas other than the gas from the steam from the liquid 5 is present in very small quantities, or is even non-existent. Ideally, only steam from the liquid is present, and no other residual gas. As this ideal solution cannot be reached, the invention perfectly operates with some residual gases.

Figure 4:
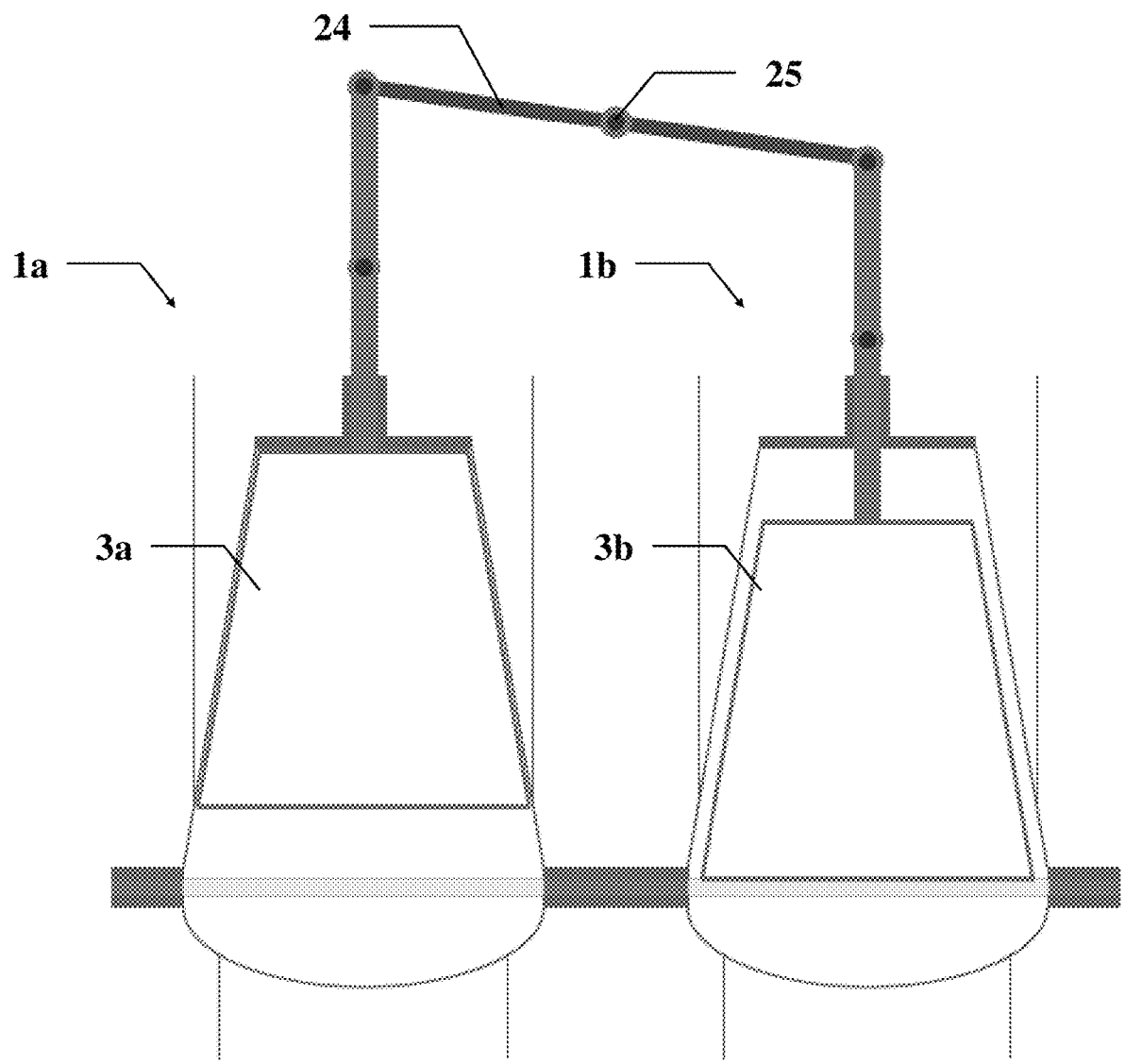
FIG. 4 illustrates the coupling of two engines.

The engine 1 may be coupled to one or several other similar engine(s). As shown in FIG. 4, a coupling comprising two similar engines 1a, 1b, a mechanical connection 24, 25 between the respective movable means 3a, 3b, with a shifting of π radians, i.e. in phase opposition, for instance obtained using a lever 24 hinged about an axis of rotation 25, advantageously enables a mutual compensation of the mass of each movable means 3a, 3b. With such a phase opposition, the movable means 3a of the first engine 1a is in the first position 15 when the movable means 3b of the second engine 1b are the second position 16, and vice versa. The displacement of one movable means 3a thus drives the other movable means 3b and counterbalances the respective masses thereof, as seen from a single common actuator. Coupling may be provided by a crankshaft or any other system enabling an appropriate synchronisation of the engines.

In the above description which refers to FIGS. 1 to 4, the case 2, 7, 8 contains the liquid, the heating of which generates steam.

The ideal, theoretical, efficiency of a machine according to the invention is higher than that of the Stirling engine for an equal speed of rotation and the same conditions of use.

According to one embodiment, the system is reversible. It has been described above when operating as an engine. According to another embodiment, it may work like a heat pump. In this case, it uses the endothermic property of vaporization and exothermic property of condensation. Evaporation is enhanced by the stirring of the mixture on the surface of the liquid resulting from the displacement thereof and the pressure drop resulting from the increase in the volume resulting from the displacement of the piston.

Condensation (or the reduction in the quantity of evaporation in the mixture) will be enhanced by the contact of the mixture with the large, preferably conical, surface, and the increase in pressure resulting from the displacement of the piston.

The steam from the liquid favours the quantity of transferred energy.

The liquid volatility is also a significant element which may favour the heat pump efficiency.

Although a preferred embodiment of the invention has been described in the present document, it should be understood that the invention is not restricted to this embodiment, and that modifications may be brought therein within the scope of the following claims.

The invention claimed is:

1. An engine comprising:
    a sealed and rigid case containing a liquid and a work mixture comprising at least steam from the liquid, with the case comprising at least one cooling wall and at least one heating wall;
    a cold source so configured as to cool the at least one cooling wall and the work mixture, with the cold source and the work mixture being able to be placed on either side of the at least one cooling wall;
    a heat source so configured as to heat the liquid or at least one heating wall, with the heat source and the liquid being placed on either side of the at least one heating wall;
    a movable device positioned within the case, which can move between a first position and a second position, with the engine being so configured that:
    the heat exchange between the work mixture and the at least one cooling wall in the second position is greater than the heat exchange between the work mixture and the at least one cooling wall in the first position;
    the movable device enables the contact between the liquid and the work mixture in the first position and that the movable device is inserted between the liquid and the work mixture in the second position;
    an actuator able to move the movable device from the first position to the second position and vice versa; and
    at least one cylinder comprising at least one piston, with said piston being different from the movable device and the actuator, with one space of said cylinder being in fluid communication with the case so as to contact the work mixture,
    wherein, during the whole operation thereof, the engine is configured to apply temperature and pressure conditions to the liquid so that the liquid does not boil.

2. The engine according to claim 1, wherein the work mixture contains at least one gas and steam from the liquid, with the gas being different from the steam.

3. The engine according to claim 2, wherein, for the same increase in temperature, a pressure of the liquid steam increases the pressure of the work mixture faster than gas pressure alone.

4. The engine according to claim 1, wherein the second position is so configured that the movable device prevents or reduces the formation of steam from the liquid.

5. The engine according to claim 4, so configured that, in the first position, the movable device minimizes a volume of the heat exchange between the work mixture and the at least one cooling wall, and that, in the second position, the movable device maximizes the volume of the heat exchange between the work mixture and the at least one cooling wall.

6. The engine according to claim 1, so configured that a surface of heat exchange between the work mixture and the cold source is at least five times greater than the surface of heat exchange between the work mixture and the surface of the liquid.

7. The engine according to claim 1, wherein the case comprises at least one case portion wherein the liquid is present and the heat source heats the liquid present in the case portion.

8. The engine according to claim 7, wherein the heat source is in contact with the at least one heating wall.

9. The engine according to claim 8, wherein the at least one cooling wall of the case and the first wall of the movable device have conical shapes, with an axis substantially parallel to the displacement of the movable device.

10. The engine according to claim 1, so configured that the temperature and pressure conditions applied to the liquid in operation remain lower than the temperature and pressure conditions enabling the liquid to boil.

11. The engine according to claim 10, so configured that the temperature and pressure conditions applied to the liquid are such that, for a given pressure, the temperature of the liquid ranges from 1.0*Tli to 0.98*Teb, with Teb being the boiling temperature for such pressure, and Tli being the liquefaction temperature for such pressure.

12. The engine according to claim 1, so configured that the volume of heat exchange between the liquid and the work mixture is greater in the first position than the volume of the heat exchange between the liquid and the work mixture in the second position.

13. The engine according to claim 1, so configured that: the movable device is inserted between the at least one cooling wall and the work mixture in the first position and enable the contact between the work mixture and the at least one cooling wall in the second position.

14. The engine according to claim 1, wherein the movable device comprises a first wall having a shape matching the shape of the at least one cooling wall and so configured as to cover at least a part of the at least one cooling wall in the first position and to release or uncover at least a part of the at least one cooling wall in the second position.

15. The engine according to claim 1, wherein the case comprises, in contact with the surface of the liquid, a drilled wall forming a grid, and on the periphery of the surface of the liquid, a turbulence preventing rim.

16. The engine according to claim 1, wherein the actuator is independent of the piston.

17. The engine according to claim 1, wherein the actuator is indirectly driven by the piston.

18. The engine according to claim 1, wherein the liquid is selected among: water, an aqueous solution, alcohol, oil or a mixture of such liquids and wherein gas is air, nitrogen, carbon dioxide, hydrogen or helium or a mixture of such gases.

19. An engine assembly comprising at least two engines according to claim 1, each engine comprising:
- a sealed and rigid case containing a liquid and a work mixture comprising at least steam from the liquid, with the case comprising at least one cooling wall and at least one heating wall;
- a cold source so configured as to cool the at least one cooling wall and the work mixture, with the cold source and the work mixture being able to be placed on either side of the at least one cooling wall;
- a heat source so configured as to heat the liquid or at least one heating wall, with the heat source and the liquid being placed on either side of the at least one heating wall;
- a movable device positioned within the case, which can move between a first position and a second position, with the engine being so configured that:
- the heat exchange between the work mixture and the at least one cooling wall in the second position is greater than the heat exchange between the work mixture and the at least one cooling wall in the first position;
- the movable device enables the contact between the liquid and the work mixture in the first position and that the movable device is inserted between the liquid and the work mixture in the second position;
- an actuator able to move the movable device from the first position to the second position and vice versa; and
- at least one cylinder comprising at least one piston, with said piston being different from the movable device and the actuator, with one space of said cylinder being in fluid communication with the case so as to contact the work mixture, wherein, during the whole operation thereof, the engine is configured to apply temperature and pressure conditions to the liquid so that the liquid does not boil, the engines operated in opposite phases, wherein the movable devices of said at least two engines are mechanically connected so that respective moving masses thereof are counterbalanced.

20. The engine according to 13, wherein the movable device comprises a second wall so formed as to release or uncover at least a part of the surface of the liquid in the first position and to cover at least a part of the surface of the liquid in the second position.

21. The engine according to claim 20, wherein the movable device, specifically the first wall and/or the second wall have a recessed shape.

22. The engine according to claim 21, wherein the shape of the cooling wall and the matching shape of the first wall opposite thereof are optimized to increase the surface released by the displacement of the movable device.

23. The engine according to claim 22, wherein said shapes are conical with an axis substantially parallel to the displacement of the movable device.

24. The engine according to claim 20, wherein the movable device, specifically the first wall and/or the second wall are made of a material lighter than steel.

25. The engine according to claim 20, wherein the at least one cooling wall and/or the heating wall are made of copper or graphite.

26. A system comprising at least one engine, the engine comprising:
- a sealed and rigid case containing a liquid and a work mixture comprising at least steam from the liquid, with the case comprising at least one cooling wall and at least one heating wall;
- a cold source so configured as to cool the at least one cooling wall and the work mixture, with the cold source and the work mixture being able to be placed on either side of the at least one cooling wall;
- a heat source so configured as to heat the liquid or at least one heating wall, with the heat source and the liquid being placed on either side of the at least one heating wall;
- a movable device positioned within the case, which can move between a first position and a second position, with the engine being so configured that:
- the heat exchange between the work mixture and the at least one cooling wall in the second position is greater than the heat exchange between the work mixture and the at least one cooling wall in the first position;
- the movable device enables the contact between the liquid and the work mixture in the first position and that the movable device is inserted between the liquid and the work mixture in the second position;
- an actuator able to move the movable device from the first position to the second position and vice versa; and
- at least one cylinder comprising at least one piston, with said piston being different from the movable device and the actuator, with one space of said cylinder being in fluid communication with the case so as to contact the work mixture, wherein, during the whole operation thereof, the engine is configured to apply temperature and pressure conditions to the liquid so that the liquid does not boil, and
a generator coupled to the piston and so configured as to produce electricity from the mechanical energy available on the piston.

27. A method for controlling an engine, the engine comprising:
- a sealed and rigid case containing a liquid and a work mixture comprising at least steam from the liquid, with the case comprising at least one cooling wall and at least one heating wall;
- a cold source so configured as to cool the at least one cooling wall and the work mixture, with the cold source and the work mixture being able to be placed on either side of the at least one cooling wall;
- a heat source so configured as to heat the liquid or at least one heating wall, with the heat source and the liquid being placed on either side of the at least one heating wall;
- a movable device positioned within the case, which can move between a first position and a second position, with the engine being so configured that:
- the heat exchange between the work mixture and the at least one cooling wall in the second position is greater than the heat exchange between the work mixture and the at least one cooling wall in the first position;
- the movable device enables the contact between the liquid and the work mixture in the first position and that the movable device is inserted between the liquid and the work mixture in the second position;
- an actuator able to move the movable device from the first position to the second position and vice versa; and
- at least one cylinder comprising at least one piston, with said piston being different from the movable device and the actuator, with one space of said cylinder being in fluid communication with the case so as to contact the work mixture, wherein, during the whole operation thereof, temperature and pressure conditions are applied to the liquid so that the liquid does not boil.

28. A method according to claim 27, wherein the temperature and pressure conditions applied to the liquid are such that, for a given pressure, the temperature of the liquid ranges from $1.0*Tli$ to $0.98*Teb$, with Teb being the boiling temperature for such pressure, and Tli being the liquefaction temperature for such pressure.

29. A heat pump comprising:
- a sealed and rigid case containing a liquid and a work mixture comprising at least steam from the liquid,
- a heat source able to heat the liquid,
- a cold source able to cool the work mixture,
- movable device, positioned within the case, which can move between:
  - a first position where the movable device minimizes the volume of the heat exchange between the work mixture and the cold source, and maximizes the volume of the heat exchange between the liquid and the work mixture, and
  - a second position where the movable device maximizes the volume of the heat exchange between the work mixture and the cold source, and minimizes the volume of the heat exchange between the liquid and the work mixture, and
- an actuator able to move the movable device from the first position to the second position and vice versa; and
- at least one cylinder comprising one piston, with said piston being different from the movable device and the actuator, with one space of said cylinder being in fluid communication with the case so as to contact the work mixture,
- with the heat pump being so configured that the displacements of the piston and of the movable device cause a transfer of heat from the heat source to the cold source, wherein, during the whole operation thereof, the engine is configured to apply temperature and pressure conditions to the liquid so that the liquid does not boil.

30. A heat pump according to claim 29, wherein the work mixture consists of at least one gas and steam from the liquid, with the at least one gas being different from steam and wherein, for the same increase in temperature, the pressure of the liquid steam increases the pressure of the work mixture faster than the gas pressure alone.

* * * * *